Patented Mar. 30, 1926.

1,579,112

UNITED STATES PATENT OFFICE.

WILLIAM HUNTER, OF EDINBURGH, AND JOHN GUNTER FAIRGRIEVE, OF UDDINGSTON, SCOTLAND, ASSIGNORS TO WILLIAM TOD JUNIOR AND COMPANY (1923) LIMITED, OF POLTON, MIDLOTHIAN, SCOTLAND, A BRITISH COMPANY.

PROCESS FOR THE PRODUCTION OF ARTICLES OF THE PHENOL-FORMALDEHYDE CONDENSATION-PRODUCT TYPE.

No Drawing. Application filed May 14, 1924. Serial No. 713,318.

*To all whom it may concern:*

Be it known that we, WILLIAM HUNTER and JOHN GUNTER FAIRGRIEVE, both subjects of the King of Great Britain, residing at Edinburgh, Scotland, and Uddingston, Lanarkshire, Scotland, respectively, have invented certain new and useful Improvements in Processes for the Production of Articles of the Phenol-Formaldehyde Condensation-Product Type, of which the following is a specification.

This invention relates to an improved process for producing articles of the phenol-formaldehyde condensation product type.

It is well known that phenol and formaldehyde form condensation products, and that the condensation is effected in three phases. In the first phase the phenol and formaldehyde are heated together to a temperature of between 50 and 60° C., and the product forms generally a syrupy mass. On prolonged heating to approximately 100° C. an intermediate product of the second phase is produced, which is solid in the cold and plastic on heating. Whereas the products formed in the first two phases of condensation are soluble in certain solvents, the product becomes infusible and insoluble in ordinary solvents and unattackable by acids and bases, in the third phase which is carried out at a temperature of approximately 160° C. under pressure.

In order to accelerate the condensation between phenol and formaldehyde it is known to use organic or inorganic bases. Thus it has been proposed to use ammonia, ammonium carbonate, caustic alkalis or carbonates, hydrates of barium, strontium or calcium and the like.

When making articles of common use with a condensation product of phenol and formaldehyde, generally fibrous or cellular organic or inorganic materials are used as filling materials. Either the filling material is impregnated with the varnish-like product obtained in the first or second phases of condensation of formaldehyde and phenol, and the thus impregnated material is thereupon subjected to heat and pressure in moulds to produce the final article, or the condensation of the phenol and formaldehyde is caused to take place in or around the fibres or cells of the fibrous material, by impregnating the fibrous material with phenol and formaldehyde and then subjecting this mixture to condensation.

It has been found that some of the filling materials mix very difficultly with phenol and formaldehyde and do not allow of rapid and accurate moulding, and that when substances are used for accelerating the condensation, great difficulty is experienced in uniformly distributing these throughout the filling material. Consequently the condensation will not be uniform and the finished product will consist of parts where no condensation has taken place, or where condensation has taken place to a lesser degree than in other parts. Although this is not noticeable from the outer appearance of the finished product, it has been found that some parts of the material may behave differently as regards physical properties to other parts, thus indicating irregularities in the composition of the product.

We have found that absolutely uniform and most excellent condensation products of phenol and formaldehyde may be obtained by effecting the condensation between phenol and formaldehyde in the presence of cellulosic material containing substantial amounts of oxy-cellulose, and containing small amounts of lime and chlorine in the form of hypochlorites. If, for example, the woody and resinous constituents, such as lignine, resins, tannin, pectine and the like are removed from esparto grass or the like by digesting with caustic soda, and if the digested material is thoroughly imbibed with lime and chlorine in the form of hypochlorites, by beating, and the resulting mass is submitted to a straining process, it will be found that the finest particles passing through the straining means contain substantial amounts of oxy-cellulose, the minutest particles of which are opened and thoroughly imbibed with lime and chlorine in the form of hypochlorites, and if this material contains a certain proportion of the aforesaid chemicals, on being dried and disintegrated and mixed with phenol and formaldehyde and heated to the requisite temperature, a most uniform condensation will be effected around and within the minutest particles of said material. Thus, when the resulting mass is ground and pressed into moulds and heated, it will be found, on examination, that a most excellent finished article can be obtained, all parts of which have the same physical properties, for example as regards strength or dielectric qualties.

The best results are obtained if the percentage of calcium oxide (CaO) lies within the limits of about 4 per cent to about 8 per cent and preferably 7 per cent and if the percentage of hypochlorites lies within the limits of 0.5 to 1 per cent. These perecentages are preferably so adjusted that the total percentage of hypochlorite and lime must not exceed about 8 per cent.

If the finest particles passing through the straining means should be found not to contain the required amount of the chemicals, they may be mixed with a sludge of chloride of lime prior to being dried.

Although such a filling material may be prepared by thorough and prolonged beating of the material in the form of a pulp to which the chemicals have been added, this material may be found already prepared in large quantities as waste material in certain paper mills.

For example in the manufacture of esparto paper, the esparto grass after being dusted and sorted is digested in autoclaves with steam and a solution of caustic soda for several hours. This pulp is drawn off and the now quite soft fibrous material is extracted, and transported to the so-called "potchers". There the esparto grass is chopped into very small pieces. After a few hours a solution of hypochlorites of lime obtained by lixiviating chloride of lime with water is added. After treatment the bleaching agent is washed out with water and the material is passed into agitating tanks, and finally it is beaten in a beating machine for 8 to 10 hours, and from there, after passing through an agitating tank, the esparto pulp is passed to a paper making machine on to a wire gauze belt. The water draining through the wire contains a considerable amount of the minutest parts of esparto grass, and this esparto grass pulp passing through the strainers contains most of the oxy-cellulose into which part of the esparto grass has been transformed during the prior treatment together with the bleaching agent taken up by the fibres. In paper mills the water containing the suspended esparto grass residue is run to waste, but we have found that the suspended material contained in this waste has just the desired qualities for our purpose. If it should not contain the amount of free lime and hypochlorite required we preferably run it to the settling pond into which the lime sludge from the lixiviating tank is run and it will then take up sufficient lime and hypochlorites to be suitable for our purpose.

The present invention provides a process for the production of articles of use which consists in effecting the condensation between substances of the phenol character and formaldehyde in the presence of cellulosic material containing substantial amounts of oxy-cellulose and containing lime and chlorine in the form of hypochlorites.

We not only provide a process for producing articles of use which are absolutely uniform, but we also provide a process for utilizing the huge amounts of waste material which are at present not used.

The amounts of oxy-cellulosic material which can be used in relation to the proportion of the amount of phenol-formaldehyde used, depends on the way the mixing is effected, and on the kind and quality of the cellulosic material used.

The proportions may vary within wide limits, from about 35 per cent to about 65 per cent and more of cellulosic material.

In the case of waste oxy-cellulosic material obtained from esparto grass, especially when a mechanical mixer is used, the best proportions are approximately 60–65 per cent cellulosic material, to 35–40 per cent phenol-formaldehyde. When wood pulp residue is used, the proportions of cellulosic material are 35–40 per cent to 60–65 per cent phenol-formaldehyde.

In carrying out the invention, for example with esparto waste, the suspended fibrous cellulose contained in effluent water of paper mills especially of esparto paper mills in which bleach has been used thus becoming thoroughly impregnated with lime and chlorine, is separated from the water by settling or other known means, dried, very finely ground thoroughly mixed with formaldehyde and phenol in the proportions above indicated and heated to about 50° C. to effect the preliminary condensation until the product acquires a granular formation. The granular product is thereupon ground very finely and pressed in a known manner, in the moulding press under heat and pressure. For some purposes the articles may be moulded hot in which case the operation is complete when the article leaves the mould. In other cases (especially in those cases in which a high di-electric constant is required), the article is moulded in the cold or only at a slightly elevated temperature. The moulded article is then transferred to an oven, where it can be dried at temperatures of 160° C., and at pressures of 60–100 pounds per square inch.

The known products obtained by mixing fibrous material with phenol and formaldehyde and subjecting the mixture to condensation become sticky and most difficult to grind prior to moulding, whereas the condensation products obtained according to the present invention after the first and second phases of condensation are not sticky and can be very easily ground, and it is assumed that the oxy-cellulose in intimate admixture with the lime and hypochlorite contained therein has a special intermolecular effect on the condensation.

We wish it to be understood that throughout the foregoing specification the term "phenol" is intended to include any substance having a phenolic character and adapted to form condensation products with formaldehyde and the like and that the term "formaldehyde" is not intended to be restrictive to formaldehyde proper but to include any other substances of the aldehyde character adapted to form condensation products with "phenol".

We claim:—

1. The process for the production of articles of use from phenol aldehyde condensation products which consists in carrying out condensation between substances of phenolic character and substances of aldehydic character, in the presence of solid cellulosic materials containing substantial amounts of oxy-cellulose and containing lime and chlorine in the form of hypochlorites.

2. The process for the production of articles of use from phenol aldehyde condensation products which consists in carrying out condensation between substances of phenolic character and substances of aldehydic character, in the presence of solid cellulosic materials containing substantial amounts of oxy-cellulose and containing calcium oxide within the limits of about 4 per cent to 7.5 per cent and hypochlorites within the limits of 0.5 per cent to 1 per cent.

3. The process for the production of articles of use from phenol aldehyde condensation products which consists in carrying out condensation between substances of phenolic character and substances of aldehydic character, in the presence of solid cellulosic materials containing substantial amounts of oxy-cellulose and containing lime and chlorine in the form of hypochlorites in a total amount not exceeding 8 per cent.

4. The process for the production of articles of use from phenol aldehyde condensation products which consists in carrying out condensation between substances of phenolic character and substances of aldehydic character, in the presence of solid cellulosic materials obtained from the effluent water of esparto paper mills in which bleaching powder has been used and containing substantial amounts of oxy-cellulose and containing lime and chlorine in the form of hypochlorites.

5. The process for the production of articles of use from phenol aldehyde condensation products which consists in carrying out condensation between substances of phenolic character and substances of aldehydic character, in the presence of solid cellulosic materials obtained from the effluent water of esparto paper mills in which bleaching powder has been used and containing substantial amounts of oxy-cellulose and containing calcium oxide within the limits of about 4 per cent to 7.5 per cent and hypochlorites within the limits of 0.5 per cent to 1 per cent.

6. Process for the production of articles of use from phenol aldehyde condensation products which consists in carrying out condensation between substances of phenolic character and substances of an aldehydic character, in the presence of solid cellulosic materials containing substantial amounts of oxy-cellulose and containing lime and chlorine in the form of hypochlorites, said cellulosic materials being obtained by separating the suspended fibrous material from the effluent water of paper mills in which bleaching powder has been used, drying the separated fibrous material and grinding same finely.

7. Process for the production of articles of use from phenol aldehyde condensation products which consists in carrying out condensation between substances of phenolic character and substances of an aldehydic character, in the presence of solid cellulosic materials containing substantial amounts of oxy-cellulose and containing lime and chlorine in the form of hypochlorites, said cellulosic materials being obtained by separating the suspended fibrous material from the effluent water of esparto paper mills in which bleaching powder has been used, drying the separated fibrous material and grinding same finely.

8. In the process for the production of articles of use from phenol aldehyde condensation products the steps which consist in separating the suspended fibrous material from the effluent water of paper mills in which bleaching powder has been used, drying the separated fibrous material, grinding same finely, mixing same with formaldehyde and phenol in the requisite proportions, heating the mixture to about 50° C. to effect preliminary condensation until the product acquires a granular formation and thereupon finally grinding the resulting product.

9. In the process for the production of articles of use from phenol aldehyde condensation products the steps which consist in separating the suspended fibrous material from the effluent water of esparto paper mills in which bleaching powder has been used, drying the separated fibrous material, grinding same finely, mixing same with formaldehyde and phenol in the requisite proportions, heating the mixture to about 50° C. to effect preliminary condensation until the product acquires a granular formation and thereupon finally grinding the resulting product.

10. In the process for the production of articles of use from phenol aldehyde condensation products the steps which consist in separating the suspended fibrous material from the effluent water of paper mills in which bleaching powder has been used, and containing calcium oxide within the limits of about 4 per cent to 7.5 per cent and hypochlorites within the limits of 0.5 per cent to 1 per cent, drying the separated fibrous material, grinding same finely, mixing same with formaldehyde and phenol in the requisite proportions, heating the mixture to about 50° C., to effect preliminary condensation until the product acquires a granular formation and thereupon finally grinding the resulting product.

11. In the process for the production of articles of use from phenol aldehyde condensation products the steps which consist in separating the suspended fibrous material from the effluent water of esparto paper mills in which bleaching powder has been used, and containing calcium oxide within the limits of about 4 per cent to 7.5 per cent and hypochlorites within the limits of 0.5 per cent to 1 per cent, drying the separated fibrous material, grinding same finely, mixing same with formaldehyde and phenol in the requisite proportions, heating the mixture to about 50° C., to effect preliminary condensation until the product acquires a granular formation and thereupon finally grinding the resulting product.

12. In the process for the production of articles of use from phenol aldehyde condensation products the steps which consist in separating the suspended fibrous material from the effluent water of paper mills in which bleaching powder has been used, making up the lime and hypochlorite contents in said material to be within the limits of about 4 per cent to 7.5 per cent calcium oxide and 0.5 per cent to 1 per cent hypochlorites, drying the separated fibrous material, grinding same finely, mixing same with formaldehyde and phenol in the requisite proportions, heating the mixture to about 50° C., to effect preliminary condensation until the product acquires a granular formation and thereupon finally grinding the resulting product.

13. In the process for the production of articles of use from phenol aldehyde condensation products the steps which consist in separating the suspended fibrous material from the effluent water of esparto paper mills in which bleaching powder has been used, making up the line and hypochlorite contents in said material to be within the limits of about 4 per cent to 7.5 per cent calcium oxide and 0.5 per cent to 1 per cent hypochlorites, drying the separated fibrous material, grinding same finely, mixing same with formaldehyde and phenol in the requisite proportions, heating the mixture to about 50° C., to effect preliminary condensation until the product acquires a granular formation and thereupon finally grinding the resulting product.

In testimony whereof, we affix our signatures.

WILLIAM HUNTER.
J. G. FAIRGRIEVE.